United States Patent Office 3,451,944
Patented June 24, 1969

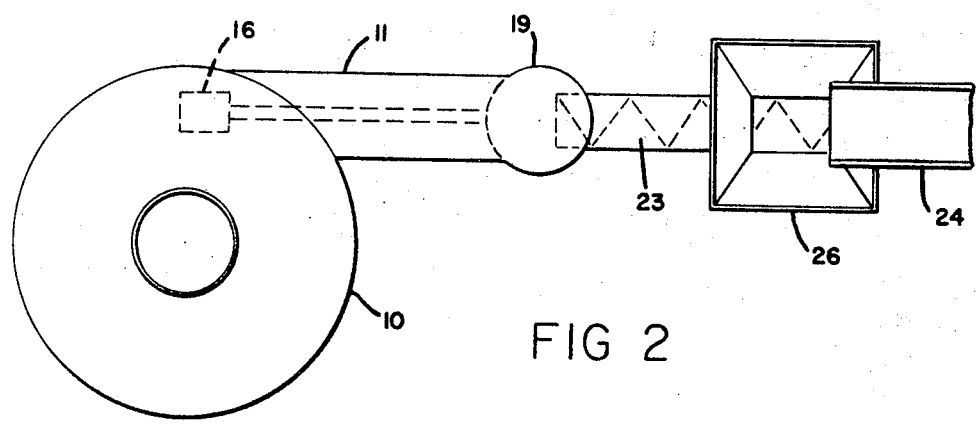
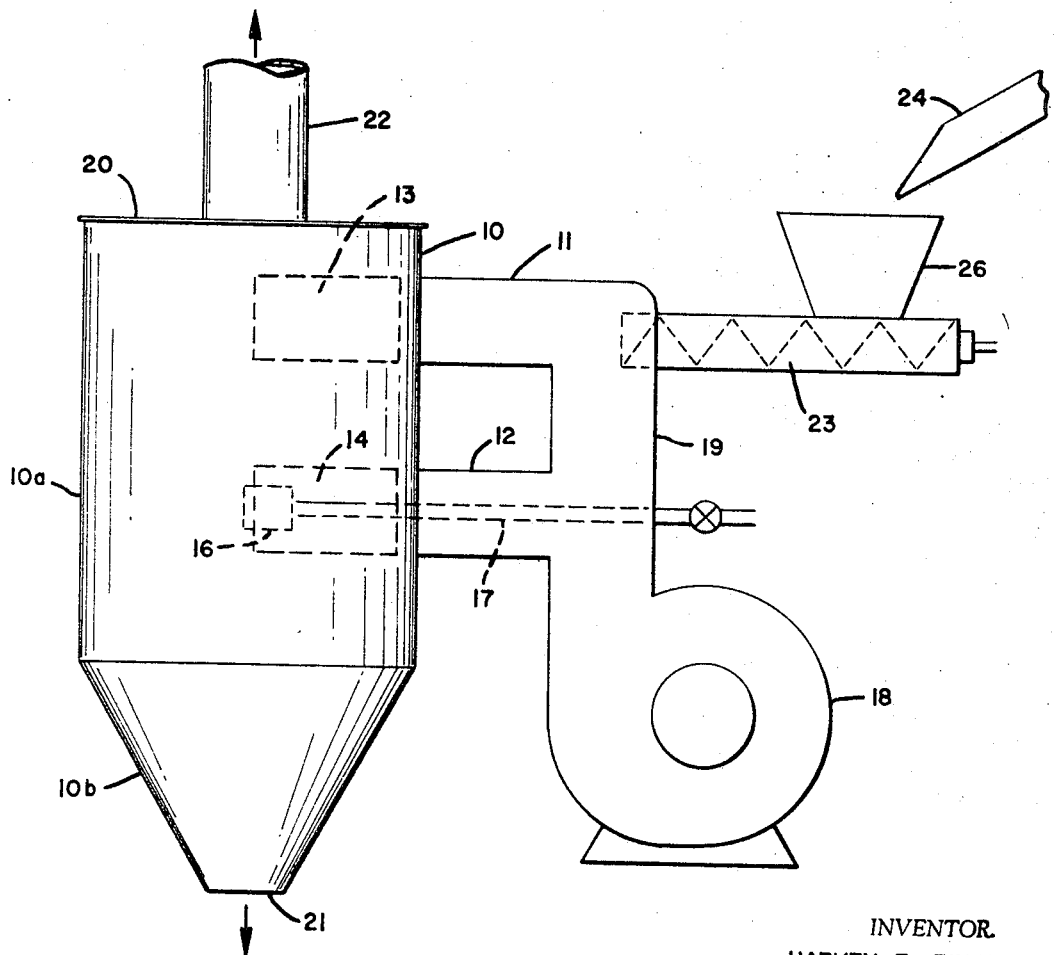

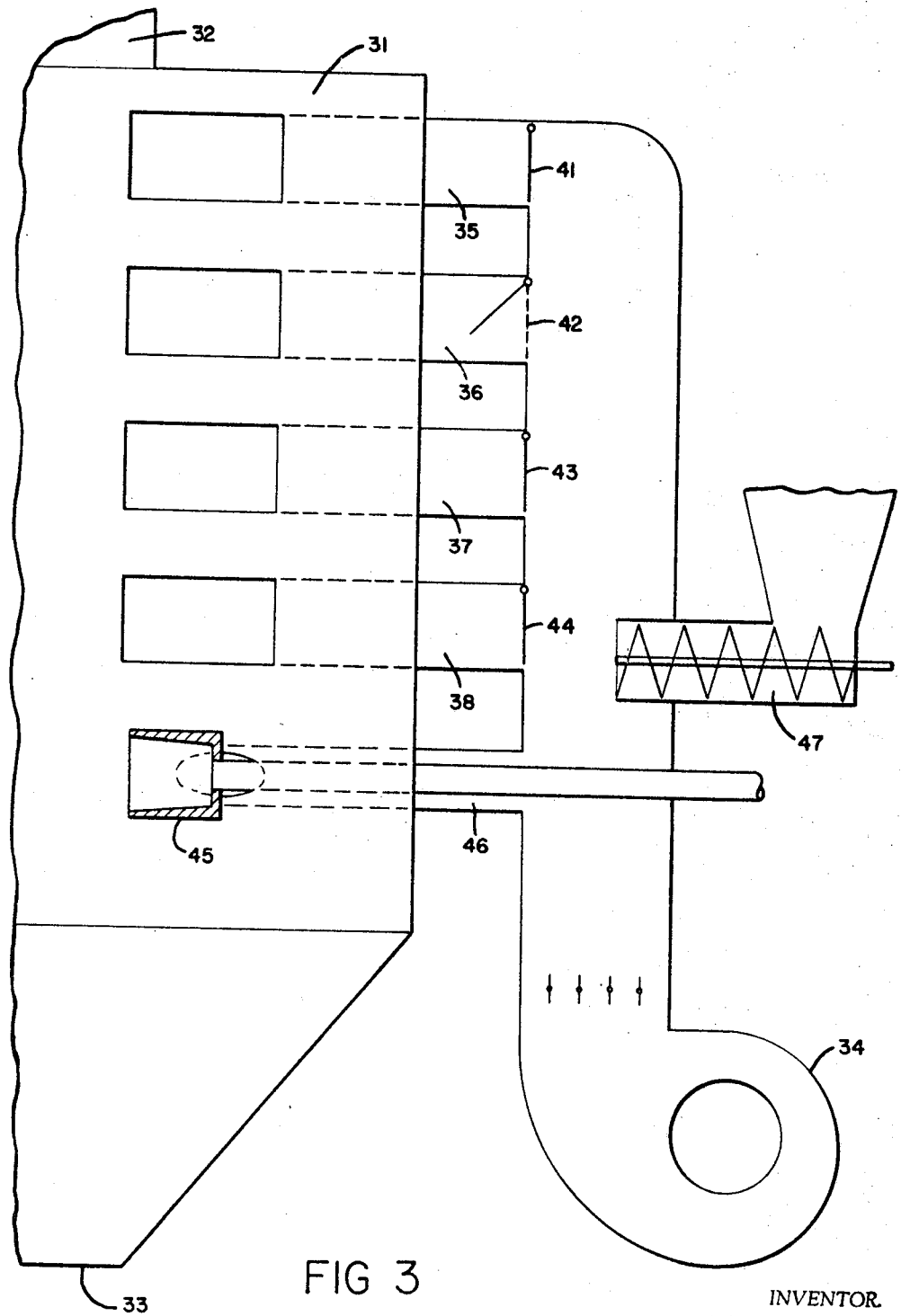

3,451,944
RICE HULL METHOD, APPARATUS
AND PRODUCT
Harvey E. Finch, San Bruno, Calif., assignor of one-half
to Richard Redlick, Portola Valley, Calif.
Filed Nov. 27, 1964, Ser. No. 414,184
Int. Cl. C01b 31/08, 31/10; F27b 15/00
U.S. Cl. 252—421
10 Claims

ABSTRACT OF THE DISCLOSURE

Method for making a carbonized product useful as a filter medium from rice hull. The rice hulls are fed continuously to a combustion zone of hot swirling gases where the hulls are partially burned and carbonized while dispersed, after which the carbonized particles are removed. The product has a skeletal silica in the form of a lattice structure with carbon dispersed therein.

---

This invention relates generally to apparatus and methods for the controlled burning of rice hull, and to products resulting therefrom.

In the rice milling industry, the rice kernels are subjected to processing operations which remove the hull portion, and which produce a by-product commonly known as rice hull. This material at present has little if any commercial value, and it is common for mills to pay for its removal. In some regions, the hulls are burned in open pits and little if any attempt is made to sell the remaining ash. Burning under such conditions is without control as to time and temperature factors, and as a result the product produced is not suitable for the uses to which products made by the present method are applicable. Particularly, burning at relatively high temperatures for considerable periods of time serves to change the natural skeletal or lattice structure of the material, due primarily to more or less fusion of the skeletal silica present. By skeletal silica, I have reference to the largely siliceous material present which is distributed in such a manner as to form a natural lattice or skeleton structure. It may contain silicates and other inorganic materials, including small amounts of sodium. The final product produced by open pit burning has little if any lattice structure because the natural lattice structure is either substantially altered or completely destroyed by fusion. Such a product does not have good adsorptivity, and it cannot be activated with respect to its adsorptivity by known methods, such as treatment with super-heated steam. I have discovered that with conrolled burning as disclosed herein the siliceous skeleton present is not subjected to material fusion or destruction, and the natural lattice structure is reained and characterizes the final product. Also by controlled burning I can produce a carbon containing material that can be treated to provide good adsorptive activity.

In general, it is an object of the present invention to provide a method and apparatus which is characterized by continuous controlled burning of rice hull to produce usable products.

Another object of the invention is to provide a method and apparatus of the above character which can be carried out with relatively simple equipment, and which provides good control with respect to factors which affect the character of the final product.

Another object of the invention is to provide a method and apparatus of the above character which makes possible production of products which are useful as filter aids and which may have good adsorptivity.

Another object of the invention is to provide novel products resulting from application of my method.

Further objects of the invention will appear from the following description in which the preferred embodiments have been set forth in detail in conjunction with the accompanying drawing.

Referring to the drawing:

FIGURE 1 is a side elevational view illustrating a furnace for carrying out my method;

FIGURE 2 is a plan view of the furnace shown in FIGURE 1;

FIGURE 3 is a side elevational view in section illustrating another embodiment of my furnace.

Figure 4:
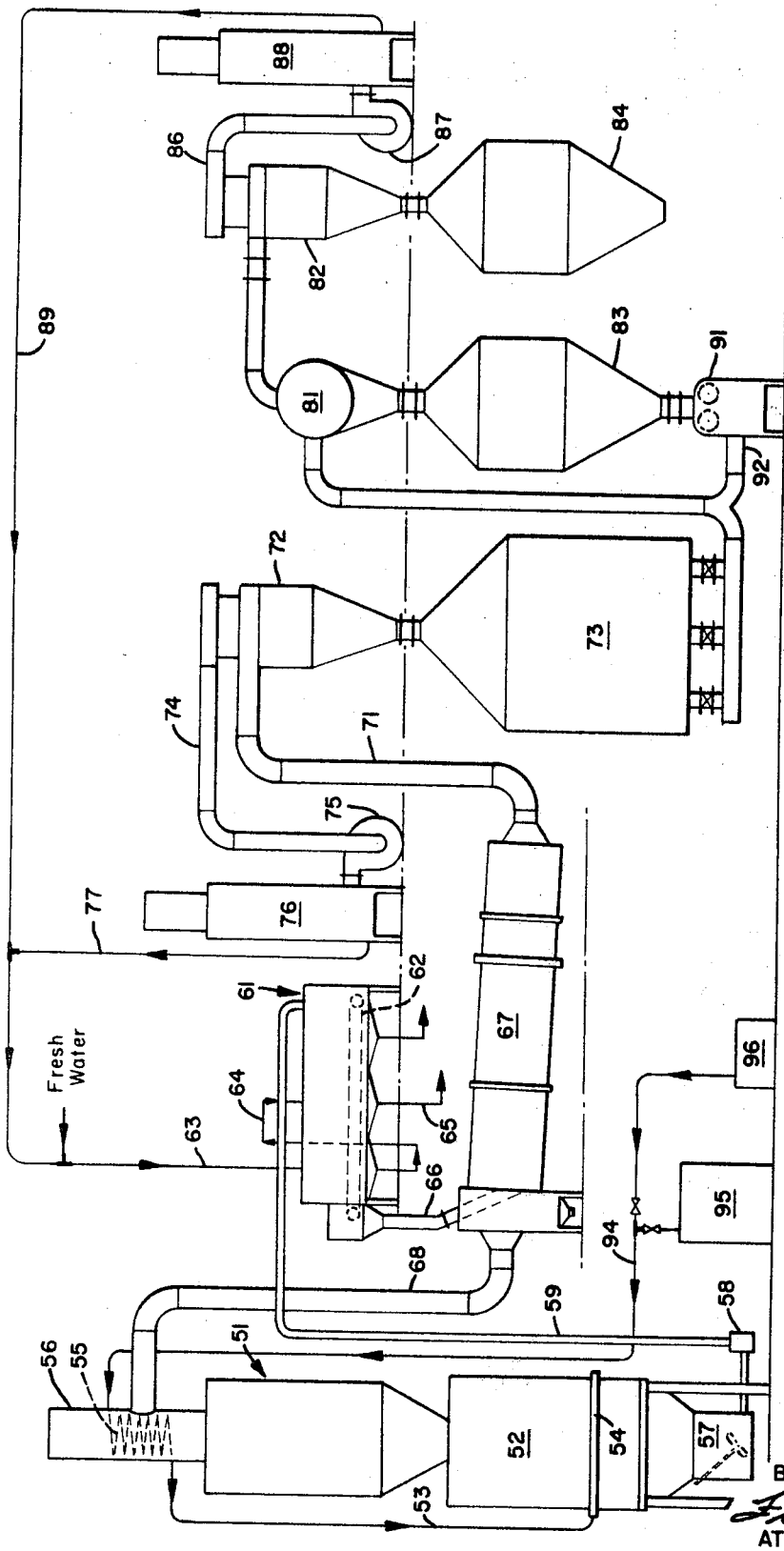
FIGURE 4 is a side elevational view schematically illustrating equipment comprising a complete processing system.

My invention can be best understood after a description of the apparatus shown in FIGURES 1 and 2. This apparatus consists of a combustion chamber 10, provided with a suitable refractory lining (not shown). Conduits 11 and 12 have openings 13 and 14 disposed tangentially with respect to the side walls of the chamber 10. A fuel burner 16 is disposed within the stream of air discharging from the opening 14, and may be one of the ceramic cup type supplied with natural gas or other suitable fuel through the pipe 17. A blower 18 has its discharge conduit 19 connected to both the conduits 11 and 12. The main portion 10a of the chamber 10 may be substantially cylindrical as shown, and the lower portion 10b can be conical shaped, with a lower discharge outlet opening 21. An exhaust conduit 22 connects through the top wall 20 of the combustion chamber.

Suitable means is provided for feeding rice hull at a controlled rate into the furnace to commingle with hot gases maintained in the combustion zone. In the embodiment illustrated a feed device of the rotary screw type 23 is shown having its discharge end in the upper portion of the conduit 19, whereby rice hull introduced into the airstream is conveyed pneumatically into the combustion chamber 10 through the conduit 11. Suitable conveying means 24, such as one of the vibrating type, is provided to supply rice hull to the hopper 26 of the feed device 23.

The apparatus described above is employed as follows. The blower 18 is operated to supply a suitable volume of air through the conduits 11 and 12. Such air is delivered tangentially into the combustion chamber 10, thus causing swirling movement about the central vertical axis. Fuel such as natural gas is supplied to the burner 16, and the burner is ignited to provide an igniting flame for the combustion zone. Raw rice hull of the type commonly produced in the rice industry is supplied to the feed device 23, and thus fed at a controlled rate into the airstream being delivered through conduit 11. As the rice hull enters the combustion chamber 10, it swirls about in entrainment and in dispersed form together with the hot swirling gases. The flame from burner 16 ignites the hulls whereby, after a short initial run, the zone within the combustion chamber extending substantially for the height over which the air is being introduced becomes heated to a relatively elevated temperature, the temperature being maintained primarily by combustion of the combustible constituents in the rice hull. The combustible constituents include carbonaceous or cellulosic constituents of the hull together with combustible vaporizable constituents. The net result is that within the burning zone just described the burning rice hulls are carried about the axis of the chamber, dispersed and entrained in the gases, with the particles after such burning being delivered progressively from the lower end of the burning zone for discharge through the outlet 21. The hot gases swirling about the interior of the combustion chamber comprise hot gaseous products of combustion, together with combustion supporting air being progressively supplied through the conduits 11 and 12.

With respect to the air supplied through conduit 12, it may be pointed out that it supplied combustion supporting oxygen for the gas supplied to the burner 16, and a substantial addition which supports combustion of the rice hull. The amount of heat supplied by the flame from the burner 16 is a relatively minor part of the heat developed within the combustion chamber. However, it is sufficient to initiate combustion and to maintain combustion after it has been initiated.

The discharge through the exhaust conduit 22 consists mainly of gaseous products of combustion, together with a relatively small amount of ash. In other words, only a negligible amount of the solids within the combustion chamber pass out through the exhaust conduit 22.

The character of the product produced is dependent upon certain control factors maintained within the combustion chamber. In general, conditions are maintained within the combustion chamber which produce products having an optimum lattice structure and with an amount of residual carbon which (without further treatment) may vary between relatively wide limits, such as from 2 to 50%. I have found that when the temperature within the combustion zone is at a level above about 2000° F., a substantial amount of fusion takes place with respect to the siliceous material present, and this serves to destroy or seriously damage the natural siliceous lattice structure. By maintaining the combustion temperature at a level within the range of about 1200 to 2000° F., fusion of skeletal silica is maintained at a minimum, and the resulting product has a good lattice structure which reflects the natural lattice structure of the original rice hull, and which makes for good properties with respect to adsorptivity and the ability of the product to function as a filter aid.

The temperature of the combustion zone can be controlled by controlling the amount of combustion supporting air delivered through the conduits 11 and 12. In general, an increase in the amount of combustion supporting air serves to lower the temperature of combustion. Conversely, a decrease in the amount of combustion supporting air generally serves to increase the temperature of combustion. The temperature of combustion and likewise the amount of carbon remaining in the final product can likewise be controlled by adjusting the rate at which the rice hull is supplied to the combustion chamber, other factors remaining constant. A decrease in the rate of supply of rice hull tends to decrease the temperature of combustion and to increase the percentage of residual carbon in the final product. Conversely, increasing the rate of introduction of the rice hull permits more complete combustion, thus reducing the amount of carbon in the final product and increasing the temperature within the combustion zone.

A typical composition for rice hulls is as follows:

| | Percent |
|---|---|
| Water | 8.6 |
| Protein | 3.6 |
| Fat | 0.9 |
| N-free extract | 29.4 |
| Fiber | 39.1 |
| Ash | 18.6 |
| Pentosans | --- |

Rice hulls have a relatively high percentage of siliceous material. Typical raw rice hulls have a content of siliceous material (as $SiO_2$) plus other inorganics of about 18.2%. The total loss of weight on ignition is about 45.4% which is attributed to the relatively large amount of siliceous material. The carbon content is about 36.4%.

After being subjected to my method, the resulting particles consist mainly of carbon together with silica and/or siliceous material, the matter being in the form of skeletal silica with carbon distributed through the same. All volatiles have been removed, and cellulosic and other organic materials have been burned to form the remaining carbon. Microscopic analysis reveals that the product has a relatively open lattice structure formed by skeletal silica, which derives its characteristics from the lattice structure of the silica content in the original raw rice hull. The lattice structure is more or less interspersed with particles of carbon, depending upon the amount of carbon present. Without further processing, this product has about 9 to 10% adsorptivity (as determined by the test method hereinafter described). It is useful as a filter aid in place of materials like diatomaceous earth. When used as a filter aid it promotes good filtering action of a sand bed or other filter medium, with a minimum amount of clogging, and it can be readily treated by backwashing according to conventional methods. Its adsorptivity aids in forming flocs or agglomerates in the processing of many materials. It is relatively granular and free-flowing in dry form, before or after grinding. Grinding to smaller particle size is generally desirable when the product is employed as a filter aid.

The particle size of the material (without further treatment) in typical instances is such that 98% passes through a No. 10 mesh screen and the balance remains upon a No. 30 mesh screen, with a bulk density ranging from about 5 to 7 pounds per cubic foot. By the use of suitable classifying means, such as classifiers of the pneumatic type, the material can be divided into coarse and fine fractions. The finer fractions have higher bulk density.

In commercial operations, and particularly when used as a filter aid, it is desirable to subject the product to grinding, and thereafter the ground material is divided into a number of different size fractions. In this way fractions can be obtained varying in size and ranging in bulk density from about 7 to 16 pounds per cubic foot.

After being subjected to my method as described above, it is possible to subject the product to various processing operations to produce products particularly suitable for certain purposes. Particularly, the hot product can be delivered into a chamber located below the combustion chamber and provided with means for admitting superheated steam. As is well known to those familiar with the manufacture of activated carbon, introduction of superheated steam into a mass of carbon, at an elevated temperature serves to activate the material, having reference particularly to its ability to adsorb color, odors and condensible constituents. Presumably treatment with superheated steam serves to open the lattice structure of the product.

Either before or after being subjected to superheated steam at an elevated temperature, the product can be contacted with a solution of a chemical capable of reducing the amount of siliceous material present. For example, the product can be subjected to a solution of an alkaline material like sodium hydroxide, which reacts with the siliceous material to open the pores of the lattice structure. This serves to further increase the adsorptivity of the material, and it reduces the relative percentage of silica. For example, assuming that a material analyses 33⅓% carbon and 66⅔% siliceous material (as $SiO_2$) after treatment with a chemical like sodium hydroxide followed by drying, the material may in a typical instance have a carbon content of 80% and a content of siliceous material (as $SiO_2$) of 20%. Thus products produced by the equipment of FIGURE 1, having a residual carbon content ranging from 2 to 50% may, after treatment involving activation by contacting the material with sodium hydroxide solution, have a free carbon content of the order of from 25 to 50%, the remaining being siliceous material.

An example of my invention is as follows: Raw rice hull was employed having an ash content which analyzed as follows.

| | Percent |
|---|---|
| $Al_2O_3$ | Trace |
| $K_2O$ | 1.6 |
| $Na_2O$ | 1.6 |
| CaO | 1.0 |
| MgO | 2.0 |
| $Fe_2O_3$ | .05 |
| $P_2O_5$ | 1.8 |
| $SO_3$ | 0.9 |
| $SiO_2$ | 89.0 |

It is known that the above analysis of rice hull ash will vary somewhat depending upon the variety of rice of which the hull is obtained, soil conditions and fertilizers employed.

With respect to moisture content, organic volatiles, carbon and silica content, the raw rice hull analyzed (by ignition) substantially as follows:

| | Percent |
|---|---|
| Moisture | 9.4 |
| Organic volatile less moisture at 1200° F. | 36.0 |
| Carbon | 36.4 |
| Silica plus other inorganics | 18.2 |
| Total | 100 |

The above rice hull was supplied continuously to equipment comparable to that described in FIGURES 1 and 2, with a sufficient amount of natural gas being supplied to the burner 16 to maintain ignition, and with air being continuously supplied through the conduits 11 and 12 to maintain combustion of the rice hull.

The combustion chamber employed in this instance had an internal diameter of about 3 feet and a height (for the cylindrical section) of about 7 feet. Air was introduced at the rate of about 800 cubic feet per minute (s.c.f.m.). The product obtained discharged continuously at an elevated temperature from the lower outlet opening 21. The temperature maintained within the burning zone was about 1,800° F. The raw rice hull was fed continuously by the device 23 at a rate of about 10 pounds per minute. The hulls were entrained in the current of air entering through the conduit 11 and thereby introduced into the burning zone with swirling motion. Burning commenced immediately upon introduction into the chamber 10, and continued as the material progressed downwardly with swirling motion. A portion of the material discharging from the outlet 21 was delivered to a chamber and permitted to cool and another portion was received within a chamber and treated as hereinafter described. The portion which was not subjected to further treatment was in the form of a coarse granular material, each particle having a shape comparable to that of the original rice hulls. The original rice hull had a density of about 7½ pounds per cubic foot, whereas the material discharging from the outlet 21, after cooling, had a density of the order of 5 pounds per cubic foot. The carbon content of this product was about 30%, the remaining material being siliceous and including the materials contained in the ash as described above. Microscopic examination of this material revealed that it had a distinct lattice structure forme dby skeletal silica and that there had been no substantial amount of fushion of siliceous material during combustion.

The portion of the above product, after cooling, was divided into four 10 gram samples which then were treated as follows:

Sample No. 1 was washed in distilled water without any chemical. The Sample No. 2 was washed in distilled water at ambient temperature containing 1.4 grams of sodium hydroxide. The Sample No. 3 was added in distilled water containing 2.8 grams of sodium hydroxide, and the Sample No. 4 was washed in distilled water having 4.2 grams of sodium hydroxide. This washing occurred at the boiling point of water (212° F.), and was continued over a period of fifteen minutes in each instance.

After treatment as described above, liquid was removed from each sample by decantation, and then the samples further washed in boiling water. Six such decantations and replacements with distilled water were employed to remove essentially all alkalinity.

After drying, the various samples were found to have weights as follows:

| | No. 1 | No. 2 | No. 3 | No. 4 |
|---|---|---|---|---|
| | Distilled water+0 grams NaOH | Distilled ater+1.4 Grams NaOH | Distilled water+2.8 grams NaOH | Distilled Water+4.2 grams NaOH |
| Dry weight in grams | 9.2 | 6.5 | 5.9 | 5.6 |
| Weight loss in grams | 0.1 | 3.5 | 4.1 | 4.4 |

The weight loss for each o fthe samples, by virtue of the treatment described above, is attributed to removal of siliceous material. Particularly treatment with sodium hydroxide serves to dissolve out a portion of the silica content. Microscopic examination of these treated samples showed that the same lattice structure was present but was more open in character.

The four dried samples produced as described above were subjected to conventional tests to determine their adsorptivity, particularly with respect to adsorption of color. Thus, a 1 gram fraction of each sample was ground in a mortar to provide a particle size comparable to standard activated carbons used for reference. A sugar solution was prepared to provide a standard for color adsorption. This was a 50 BX sugar solution containing 100 grams of raw sugar. One gram portion of my ground product were added to said solution and heated to 176° F. for 30 minutes. Thereafter the solids were removed by filtration and the color of the solution measured and calculated to a percentage of the original undecolorized sugar solution. For purposes of comparison, a similer solution was treated with standard commercial activated carbons (e.g., Darco KB and Carboraffin). The color removals by the various portions, and by the reference commercial activated carbons, were as follows:

| Carbon: | Color removal, percent |
|---|---|
| Sugar solution blank | 0 |
| Carbon No. 1 | 0 |
| Carbon No. 2 | 60 |
| Carbon No. 3 | 78 |
| Carbon No. 4 | 90 |
| Darco KB | 97 |
| Carboraffin | 97 |

Sample 1 did not exhibit any substantial amount of color adsorptivity. This was a sample which was not treated with sodium hydroxide. Samples 2, 3, and 4 showed progressively increasing adsorptivity. The adsorptivity of Sample 4 was comparable to the commercial activated carbons, namely Darco KB and Carboraffin.

To demonstrate the usefulness of my product for a filter aid, two samples were prepared by use of equipment comparable to that shown in FIGURES 1 and 2, the samples having densities as follows:

| | Lbs. per cubic foot |
|---|---|
| Sample No. 1 | 14 |
| Sample No. 2 | 16 |

The variations in density of the above samples was due to variations in particle fineness. The carbon content in each instance was about 2%. A standard raw sugar liquor was prepared and subjected to filtration by use of Samples Nos. 1 and 2 and compared to a standard filter aid known commercially as Hyflo, 503 and 545. The results were as follows:

| Filter aid | Sugar liquor filterability | Filtrate turbidity |
| --- | --- | --- |
| Hyflo | 100 | 100 |
| 503 | 150 | 150 |
| 545 | 210 | 220 |
| Sample No. 1 | 125 | 240 |
| Sample No. 2 | 156 | 250 |

It will be evident from the above, that relatively good filterability is obtained by my product with only minor increases in filtrate turbidity.

In the foregoing examples, the product obtained by combustion was cooled and then directly treated with chemical solution to afford a relatively high adsorptive activity. Adsorptive activity can also be had by treatment of the product with superheated steam at an elevated temperature. Likewise products which have been treated with superheated steam can be further increased in adsorptive activity by treatment with chemical solution in the manners previously described. By way of example, a product obtained substantially as described in the foregoing example and as discharged from the combustion chamber, can be subjected to superheated steam while the material is at an elevated temperature of the order of 1800° F. Such treatment produced products having color removal ranging from about 30–48% depending upon various factors involved, including temperature, time of treatment, etc. When such samples were further treated with sodium hydroxide solution for removal of a part of the silica content, adsorptivities of the order of 94% were readily obtained.

To summarize the foregoing, it is evident from the data given by way of example that my product as produced by the equipment of FIGURES 1 and 2, without further treatment, is useful as a filter aid in various industrial filtering operations. Generally it is desirable to subject such a product to grinding to produce the particle size desired. Grinding tends to give particles that are spicular rather than spherical. When these particles form a filter cake, the packing is relatively loose and is effective to hold colloidal and larger solids without blinding on the filter surface. When further treated for promoting adsorptive activity, as by subjecting the material to superheated steam at an elevated temperature, or by chemical treatment, or both, products are obtained which are likewise useful in various industrial processes for color and other adsorptivity. All such products have a distinctive lattice or skeletal structure which is determined by the silica content, and which remains relatively unimpaired, due to the absence of fusion in the initial combustion.

FIGURE 3 shows another embodiment of my equipment. In this instance the combustion chamber 31 is provided with the upper exhaust conduit 32 and the lower discharge opening 33. The blower 34 delivers air to the conduits 35, 36, 37 and 38. These conduits all have tangential connection with the combustion chamber 31. The supply of air through each of the conduits 35–38 can be selectively controlled by adjusting the positioning of the valves 41, 42, 43 and 44. The fuel burner 45 is inserted through wall opening 46, which also connects with the blower for supplying combustion supporting air. The feed device 47 is of the screw type and serves continuously to introduce the rice hull into the stream of air being supplied to the conduits 35–38.

With the equipment shown in FIGURE 3 and by adjusting the setting of the valves 41–44, the air can be introduced into the combustion chamber in the regions desired to promote proper control of temperature and the extent of burning, thus producing the desired product. Particularly air can be supplied to the upper one or ones of the conduits, whereby the burning zone is caused to extend for substantially the entire height of the cylindrical portion of the combustion chamber. If, on the other hand, conduit 35 is closed, while conduits 36, 37 and 38 are open, the height of the burning zone is reduced.

FIGURE 4 illustrates equipment forming a complete system for the production of various products from raw rice hull. Unit 51 represents combustion equipment as shown in either FIGURES 1 or 3. The conduit connections and piping for igniting fuel have been omitted. The lower outlet of the combustion chamber 51 is shown connecting directly with the receiving chamber 52. Activation by contact with superheated steam can be carried out in the chamber 52, and for this purpose a steam line 53 is shown connected to the lower portion of the chamber 52 through the manifold 54. The steam can be supplied from a heat exchanger 55 which is shown positioned within the exhaust conduit 56. The material from chamber 52 is shown being supplied to the pulping tank 57 where it is intermixed with water to form a slurry. For promoting activation, the water preferably contains sodium hydroxide or similar chemical. The slurry from the pulping or mixing device 57 is shown being delivered by pump 58 through pipe 59 to the washing equipment 61. The equipment 61 may vary in practice, but in general it should be capable of draining liquor from the slurry, and then applying repeated washings to the remaining solid material. Assuming that this equipment is of the endless filter belt type, the slurry is delivered to the upper run of the filter belt 62, with the material then being carried to the left through successive washing operations. Wash water is preferably used counterflow, and thus the fresh water line 63 is shown being delivered to the last washing stage, with the liquor draining from this stage being supplied by line 64 to the next stage, and then the liquor withdrawn from this stage is removed by line 65. The washed wet material from the equipment 61 is shown being delivered by conduit 66 to the dryer 67. This dryer can be of the rotary drum type with its inlet end being supplied with hot drying gas through conduit 68. The hot gases for this purpose are shown being taken from the exhaust conduit 56. The dried material discharging from the dryer 67 is shown being conveyed pneumatically through the conduit 71 to the separating cyclone 72. The separated material from this cyclone is shown being delivered to the storage tank 73, and the discharging air which contains a certain amount of finely divided material is shown being delievered by conduit 74 and blower 75 to the wet washer 76, where the fines are removed by washing. As indicated by line 77, water from the washer 76 containing such fine material is used to make up the water in line 63 for the washing equipment 61.

From the storage bin 73, the material is shown being delivered pneumatically to the two classifiers 81 and 82, which are shown connected in cascade. The two fractions thus obtained are delivered to the storage bins 83 and 84. The air exhausting in classifier 82, which contains some fine dust, is shown being delivered by conduit 86 and blower 87 to the wet washer 88. Fresh water is shown being supplied to washer 88, and the outgoing water is shown being delivered by line 89 to merge with line 97 to form the wash water in line 63. Material from the hopper 83 is shown being supplied to the grinder 91, which can be of the cylindrical roll type, and this ground material is then delivered by conduit 92 to merge with the material being supplied to the classifier 81.

As indicated above, the superheated steam for the activator 52 can be supplied from the heat exchanger 55. Steam is shown being supplied to this heat exchanger by line 94, which connects with the steam boiler 95. Also the steam may be intermixed with air supplied from the compressor 96.

It will be evident that the system of FIGURE 4 can be operated to produce products having desired characteristics, including products having a desired adsorptivity. If it is desired to produce a product useful as a filter aid, but without any appreciable activity, then the combustion equipment 51 can be discharged directly to a storage hopper, where the product is permitted to cool before being handled or packaged. Such material may likewise be subjected to classification and grinding to produce fractions of the desired particle size for particular filter aid applications.

I claim:

1. In a method for the treatment of raw rice hull, continuously supplying raw rice hull to a combustion zone, said zone being characterized by hot gases swirling about a generally vertical axis, causing combustion supporting air to be continuously supplied to said zone, the hull particles in said zone while dispersed in the hot gases being subjected to controlled burning at a temperature below that which causes fusion of skeletal silica but sufficient to cause evolution and combustion of volatile constituents and organic material, thereby forming dispersed particles consisting essentially of carbon and skeletal silica, and causing the last named particles to be continuously removed from the lower portion of the zone to form the product desired.

2. A method as in claim 1 in which the controlled burning is carried out to provide a final product having a carbon content within the range of from 2 to 50%.

3. A method as in claim 1 in which the controlled burning in said zone is carried out at a temperature level within limits of from 1200 to 2000° F.

4. In a method for the treatment of raw rice hull to form usable products, the steps of continuously supplying raw rice hull to a combustion zone, said zone being characterized by hot gases swirling about a generally vertical axis, causing combustion supporting air to be continuously supplied to said zone, the hull particles in said zone being dispersed in the hot gases and subjected to controlled burning at a temperature level below that which causes fusion of skeletal silica but sufficient to cause evolution and combustion of volatile constituents and organic material, thereby forming dispersed particles consisting essentially of carbon and skeletal silica, continuously exhausting gases from an upper region of said zone that is concentric with said axis, and causing the last named particles to be continuously removed from the lower portion of the zone.

5. A method as in claim 4 in which the removed particles are subjected to superheated steam.

6. A method as in claim 4 in which the removed particles are contacted with an alkali solution to effect dissolution of a portion of the silica content, thereby increasing its adsorptivity.

7. A method as in claim 4 in which said removed particles, while at an elevated temperature, are subjected to superheated steam, and thereafter the particles contacted with an alkali solution to effect dissolution of a portion of the silica content.

8. A method as in claim 1 in which at least some of the rice hull is continuously supplied to the upper portion of the zone.

9. As a new article of manufacture, a particulate product resulting from the controlled burning of raw rice hull, said product consisting of skeletal silica in the form of a lattice structure with free carbon dispersed therein, the skeletal silica and said lattice structure of each particle being derived from not more than one original raw hull.

10. A product as in claim 9 in which the carbon content ranges from 33 to 50%.

References Cited

UNITED STATES PATENTS

| | | | |
|---|---|---|---|
| 1,396,773 | 11/1921 | Mumford | 252—424 |
| 1,556,039 | 10/1925 | Shilstone | 252—446 |
| 1,589,532 | 6/1926 | Hoodless | 252—424 |
| 2,926,073 | 2/1960 | Robinson et al. | 23—259.5 |
| 3,230,049 | 1/1966 | Erickson | 23—259.5 |

PATRICK P. GARVIN, *Primary Examiner.*

U.S. Cl. X.R.

23—259.5, 277; 252—446

PO-1050
(5/69)

UNITED STATES PATENT OFFICE
CERTIFICATE OF CORRECTION

Patent No. 3,451,944      Dated June 24, 1969

Inventor(s) Harvey E. Finch

It is certified that error appears in the above-identified patent and that said Letters Patent are hereby corrected as shown below:

In column 6, in the table shown in lines 10-18, line 12, in the column under "No. 2", below "Distilled" cancel "ater" and substitute therefor --water--; line 18, under the heading "No. 1", after "weight loss in grams----" cancel "0.i" and substitute therefor --0.8--.

Column 6, line 36, after "gram" cancel "portion" and substitute therefor --portions--.

Signed and sealed this 19th day of September 1972.

(SEAL)
Attest:

EDWARD M. FLETCHER, JR.
Attesting Officer

ROBERT GOTTSCHALK
Commissioner of Patents